Aug. 21, 1956

L. LIEBERMAN 2,760,006

MODULATION OF INTELLIGENCE SIGNALS

Filed Oct. 29, 1954

INVENTOR.
LEONARD LIEBERMAN

BY Theodore Hoefle

ATTORNEY 2,760,006

MODULATION OF INTELLIGENCE SIGNALS

Leonard Lieberman, New York, N. Y.

Application October 29, 1954, Serial No. 465,510

13 Claims. (Cl. 179—100.1)

Figures 1, 2A, 2B, 3A, 3B, 4, 5A, 5B, 5C, 6:
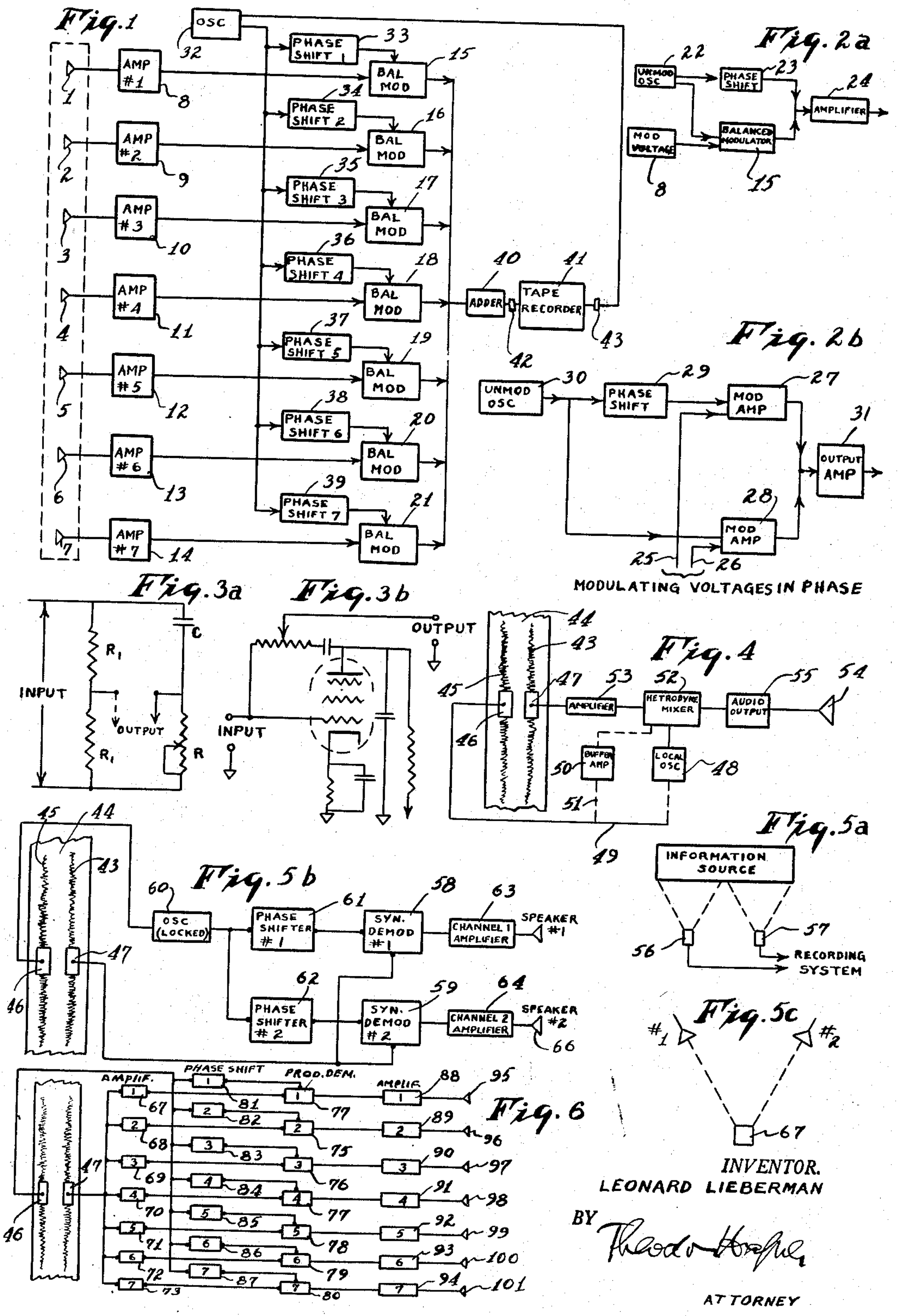

This invention relates to the modulation of intelligence signals and more particularly to the modulation of sound signals.

One of the objects of this invention is an electronic system by which a number of different signals are caused to modulate with different predetermined phase displacements a single carrier frequency, then the modulated signals are mixed and thereafter transmitted or recorded as the case may be over a single channel and on a single sound record carrier.

A more specific object of the invention in reception is to derive the envelope from the signal modulated carrier frequency and feed it back to a playback device where the different input signals are separated and applied to an amplifier chain with the result that each input is provided with a corresponding output.

These and other objects of the invention will be more fully understood from the drawings annexed hereto, in which:

Fig. 1 represents a diagram of the transmission side of a system embodying certain features of the invention.

Figs. 2*a* and *b* show modulating portions and Figs. 3*a* and 3*b* phase shifting portions of Fig. 1 in greater detail;

Fig. 4 shows the receiving side of a standard sound reproducing system, modified in accordance with certain features of the invention.

Figs. 5*a*, *b* and *c* represent, respectively, certain parts of the recording equipment of a binaural system incorporating the invention; a suitable receiving system and certain parts of its reproducing equipment.

Fig. 6 illustrates the invention as applied to the reproduction of a relatively large number of channels.

In Fig. 1 each of the pick-up devices or microphones numbered 1—7 is adapted to receive in otherwise well known manner a certain type or amount of information. The information is applied to amplifiers 8—14, each amplifier being associated with one pick-up device.

The outputs of amplifiers 8—14 are fed each to a balanced modulator schematically indicated at 15—21 and shown somewhat modified in Fig. 2*a*, where oscillator 22 is shown to control phase shifter 23 and also together with the modulating voltage derived at 8, controls balanced modulator 15. Modulator 15 together with phase shifter 23 controls common output amplifier 24.

Alternatively according to Fig. 2*b* the two modulating signal voltages fed in phase over lines 25, 26 are applied to modulating amplifiers 27, 28 to be modulated by reference voltages derived from phase shifter 29 and unmodulated oscillator 30, respectively. Oscillator 30 also controls phase shifter 29.

The signals derived from modulating amplifiers 27, 28 are combined in a summing amplifier 31 for further utilization such as recording or transmission.

The system is not limited in the number of signal sources, pick-up devices or amplifiers, except that there must be a minimum of two signal sources.

In Fig. 1 each of balanced modulators 15—21 receives an input from a continuous wave oscillator 32. The oscillator frequency input to each balanced modulator is phase shifted from the original oscillator phase and from each other by means of phase shift devices 33—39 which may be of the passive type as illustrated in greater detail in Fig. 3*a* or of the dynamic type as shown in Fig. 3*b*.

In Fig. 1 furthermore, the resulting outputs from modulators 15—21 are then applied to an adder or summing amplifier 40 of otherwise well known construction including (but not shown) a series of tubes having common plate impedances so that the resultant output is in the form of a single, phase and amplitude modulated signal resulting from the addition in the adder tubes.

The signals fed to these adder tubes are phase shifted with the aid of proper selection of phases introduced in quadrature relative to each other, and their resultant output can be in quadrature with the other outputs, so that by cascade adding, a single signal can be derived which represents the phase and amplitude modulated sum of the original inputs.

This signal also in well known manner is then magnetically recorded on a tape as indicated at 41.

Tape recorder 41 has a dual recording head or two recording heads as schematically indicated at 42, 43. The first recording head 42 receives the signal sum while the second recording head 43 receives the original oscillator signal derived from oscillator 32, unmodulated and in zero phase displacement. This second signal is used as a control or reference signal in the demodulation process at the playback or receiver end of the system as will be described further below.

In the case where binaural audio information is to be transmitted and received in accordance with this invention, during recording, two separate types of signals are developed as shown for example in Figs. 2*a* or *b*.

For reception there are several alternatives.

In one instance such as provided for exhibition in single channel motion picture houses as illustrated for example in Fig. 4, the audio signal is fed to the reproducer in form of several parallel signals, contained in signal track 43 of sound carrier 44 which also contains reference track 45. Tracks 43 and 44 are picked up by reproducing heads 46, 47 in otherwise well known manner.

It is now possible to demodulate the signal by traditional heterodyning action.

In this case the heterodyned signal can be developed by a local oscillator 48 or alternatively derived from the signal present in reference track 45 of film or tape 44. Local oscillator 48 can be locked-in with, or controlled by track 45 over line 49, connected to pick-up 46.

Alternatively the reference frequency may be directly obtained from pick-up 46 through buffer amplifier 50 over line 51.

The reference signal, whether obtained from oscillator 48 or buffer amplifier 50 is applied to a heterodyned mixer 52 together with the sound signal derived from track 43, signal pick-up 47 and amplifier 53. The detected signals thus derived from heterodyned mixer 52 are used to operate loudspeaker 54 over audio output amplifier 55 in otherwise well known manner.

Since in motion picture sound recording the main audio information originates generally from one source only, most of the modulation will be associated with the phase of that source. As a result the only difference in the output signal will be that the phase of the information will shift as the audio input shifts. The ear, however, is not phase sensitive. This fact results in a signal which to the ear is not materially different from the usual signal.

In case, however, this system is used for so-called binaural tape recording for high fidelity sound reproduction only two inputs, as shown for example in Fig. 5*a*, are derived from microphones 56, 57 and fed into a recording system of the type such as indicated for example in Fig. 2*b*.

At the playback side of this system, is illustrated for example in Fig. 5*b*, the signal is demodulated by means of synchronous or product demodulators, indicated at 58, 59. The reference phase signal for product demodulators 58, 59 is derived, as previously indicated, from the unmodulated or reference track 45 which over pick-up 46 operates the locked-in oscillator 60 controlling over phase shifters 61, 62 synchronized demodulators 58, 59. At the same time demodulators 58, 59 are controlled by signal pick-up 47 and control over amplifiers 63, 64 separate loudspeakers 65, 66.

Each of the two binaurally related signals is thus applied over separate audio amplifier to associated speakers. If the speakers are properly placed in the listening area, as shown for example in Fig. 5*c*, the phase-insensitivity of the human ear at listening point 67 will make it appear like a simultaneous reproduction.

In other systems, as illustrated for example in Fig. 6 where it is desired to reproduce at each individual output, the signal which is present in only one input which has been previously assigned to this output, the signal derived from signal pick-up 47 is fed in parallel over amplifiers 67—73 to produce demodulators 74—80.

Each of these product demodulators under control of phase shift devices 81—87 have incorporated therein a source of constant frequency and are controlled by reference pick-up 46; they produce phase displacements which is the same or at least corresponds to the phase shifts associated with the particular inputs as described previously. Product demodulators 74—80 control over output amplifiers 88—94 loudspeakers 95—101.

When the above described system is used in a motion picture house equipped for so-called "stereophonic" sound, it is possible to make each of the speakers correspond in an unequivocal relationship to the input pick-up devices and in this way the sound transmitted to the audience is an exact reproduction of space distribution of the sound present during sound recording.

The system described makes it possible to have a "compatible" sound system whereby playback units not equipped for true binaural or stereophonic reproduction will still be able to use the recorded information with only the addition of a heterodyning circuit.

The system makes it also possible to record a number of different information sources on a single carrier and by proper encoding it, can result in full conservation of bandwidth.

This further results in a simple and inexpensive method of recording of stereophonic sound information on a single channel and eliminating the need for cumbersome multiple channel recordings as are used at present.

The system can also be used in any situation where it is desired to transmit a number of different discrete pieces of information such as would be found in radio sounding operation where it is desired to transmit such diverse information as wind velocity, barometric pressure, wind direction etc.

Thus, the invention is not limited to the particular form, type, content and arrangement of multiple signal recording but can be applied in any shape and manner whatsoever, without departing from the scope of this disclosure.

I claim:

1. In a sound transmission and receiving system, a number of pick-up devices, a common oscillator, means for predeterminedly phase shifting the signals derived from said common oscillator output by different predetermined amounts corresponding to the different pick-up devices with respect to a reference signal, means for adding said phase shifted signals, means for separating the added signals according to their different phase relations, and means for recording said added signals and said reference signals separately.

2. System according to claim 1, comprising means for recording said added signals and said reference signal on parallel strips.

3. System according to claim 1, comprising an oscillator, a phase shifter and a balanced modulator, the latter two devices being controlled by said oscillator; a source of modulating voltage controlling said balanced modulator; and an amplifier having an input controlled by the common output of said phase shifter and said balanced modulator.

4. System according to claim 1, comprising an oscillator, a pair of modulated amplifiers having a common output, a phase shifter controlled by said oscillator and controlling one of said modulated amplifiers; the other of said modulated amplifiers being controlled by said oscillator directly; sources of modulations controlling respectively said modulated amplifiers; and an output amplifier controlled by said common output.

5. System according to claim 4, wherein said modulating voltages are phase shifted 180 degrees apart.

6. System according to claim 1, wherein said phase shifter is of the passive type.

7. System according to claim 5, wherein said phase shifter includes a resistance network including a pair of series connected resistors across which the input of the phase shifter is formed; a condenser and an adjustable resistor in series connected and also connected in parallel to said pair of series connected resistors; the output of the phase shifter being formed across the junction point of said series connection of two resistors and said series connection of said condensor and resistor.

8. System according to claim 1, wherein said phase shifter is of the dynamic type.

9. System according to claim 8, wherein said phase shifter includes a multigrid tube having its input between control grid and ground, and its output between ground and the slider of a potentiometer, connected between control-grid and anode.

10. System according to claim 1, wherein said utilizing means include means for recording reference and phase shifted signals on a common record carrier but on separate tracks, and playback means including several pick-up means for said separate tracks; an amplifier controlled by the pick-up means for the phase shifted signals, an output amplifier, a heterodyning mixer controlled by said first amplifier and controlling said output amplifier; and a local oscillator also controlling said heterodyning mixer and controlled by the pickup means for the reference signal.

11. System according to claim 10, comprising a buffer amplifier controlled by the pick-up for the reference signals and also controlling said heterodyning mixer.

12. System according to claim 1 for binaural reproduction, wherein said utilizing means include means for recording reference and phase shifted signals on the same record carrier but on separate tracks; and playback means including separate pick-up means for said reference and phase shifted signals respectively; a locked oscillator controlled by the pick-up means for said reference signal, a pair of phase shifters controlled by said oscillator, a pair of synchronized demodulators controlled respectively by said phase shifters and also by said pick-up means for said reference signal; and separate translating devices controlled by said demodulators, respectively, including separate output amplifiers.

13. System according to claim 1, wherein said utilizing means include means for recording reference and phase shifted signals on the same record carrier but on separate tracks; and playback means including several pick-up means for said separate tracks, a number of amplifiers corresponding to the number of phase shifted signals and controlled by said pick-up means for said phase shifted signals, a number of phase shifters and synchronized demodulator, said phase shifters being controlled respectively by said pick-up means for the reference signal and controlling said synchronized demodulator, the latter being also controlled by said amplifiers; a number of output amplifiers, controlled by said synchronized demodulators, and translating devices controlled by said output amplifiers.

References Cited in the file of this patent

UNITED STATES PATENTS

| | | |
|---|---|---|
| 2,258,662 | Snow | Oct. 14, 1941 |
| 2,536,664 | Sinnett et al. | Jan. 2, 1951 |
| 2,538,869 | Holst | Jan. 23, 1951 |
| 2,668,880 | Friess | Feb. 9, 1954 |
| 2,680,151 | Boothroyd | June 1, 1954 |